Jan. 19, 1932. M. M. GUHIN 1,842,165
EDUCATIONAL APPLIANCE
Filed Sept. 15, 1930
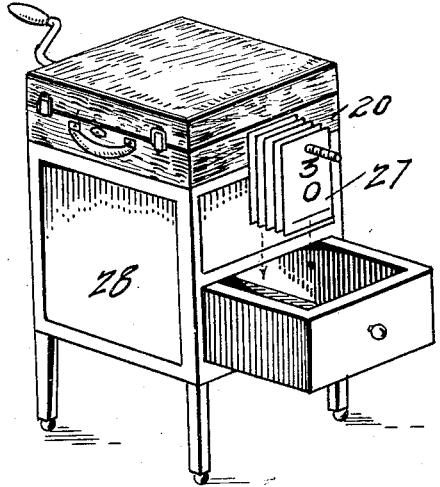
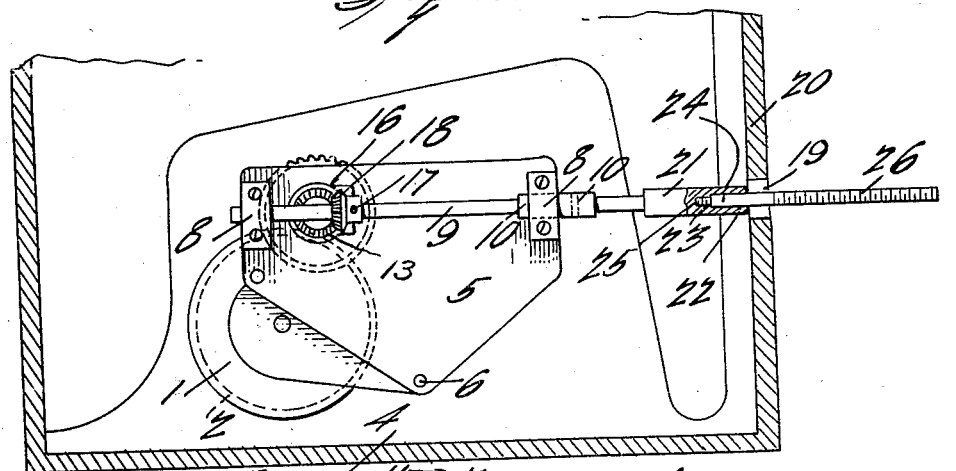
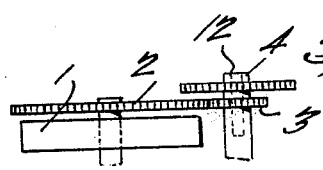

Patented Jan. 19, 1932

1,842,165

UNITED STATES PATENT OFFICE

MICHAEL M. GUHIN, OF ABERDEEN, SOUTH DAKOTA

EDUCATIONAL APPLIANCE

Application filed September 15, 1930. Serial No. 482,092.

This invention is directed to an educational appliance more particularly designed for use in teaching and perfected with a view to improving the construction and operation shown in Patent #1,484,883, issued to me February 26, 1924.

In that patent, as well as in the present construction, the primary object is the provision of a series of cards on which information to be taught, problems to be solved, or other facts are suitably inscribed, the mechanism of the apparatus being designed to present one such card and the data inscribed thereon to the eye of the pupil or observer for a predetermined period of time, following which the particular card is released and disposed of for the moment, while the next card in the series is presented.

In the patent referred to, the cards are mounted upon a supporting rod which is longitudinally movable at a rate determined by and under the control of the operator, a predetermined longitudinal movement of the rod serving to release the outermost card by withdrawing the rod and supporting element, the cards being thus presented to the eye of the pupil or observer in succession, with the period for which the card remains within the view of the observer dependent upon the rate of movement of the supporting rod, with such rate of movement controlled by the teacher or operator.

The construction described in this patent involved mechanism for operating the rod and for controlling the speed of the mechanism in order to present a device complete in itself and which, when not in use for the presentation of the cards successively, had no other function.

The primary object of the present invention is to combine the educational appliance detail with an article, say a phonograph, having an independent function and purpose, utilizing the conventional power mechanism and the control device of the phonograph for the operation and control of the educational appliance, while at the same time permitting the independent use of the phonograph or educational appliance or their combined use as may be expedient in the particular instance.

A further object of the present invention is to utilize as an essential part of the educational appliance a supporting element or rod which is held against other than a rotative movement and which serves to successively discharge the cards incident to this rotative movement, and to further provide the card discharging element of the supporting rod for convenient separation from such rod in order that when the educational appliance is not desired for use such card discharging element which forms the only part of the educational appliance projecting beyond the casing of the phonograph is to be entirely removed so that the resultant article is to all intents and purposes so far as appearances are concerned merely a conventional phonograph.

A still further object of the invention is to combine with the conventional phonograph box or casing a cabinet provided with a plurality of drawers, at least one of which is arranged to receive the cards as dropped from the discharging element of the supporting rod in order to conveniently retain the cards for re-use.

The invention is illustrated in the accompanying drawings, wherein:—

Figure 1 is a perspective view of a conventional type of phonograph with the educational appliance in operative relation thereto.

Figure 2 is a bottom plan view of a phonograph, the box or casing being shown in section and the mechanism of the improved educational appliance in applied position.

Figure 3 is a side elevation of the same, the casing being omitted.

Figure 4 is a similar view taken at right angles to Figure 2.

As previously stated, the invention involves the combination of a conventional phonograph, preferably of the portable type, with an educational appliance of the type described in my patent above referred to, and while it is to be understood that the phonograph with which the educational appliance is combined is conventional in all respects and remains fully and completely operative as a phonograph either independently of or during the operation of the educational appliance. It is not deemed necessary for the present purposes to attempt a description of the mechanism of the phonograph, it being understood that it involves all the usual parts, such as a motor, turntable, stylus, horn, starting and stopping means, and means for regulating the speed of the motor.

The only parts of the phonograph necessary to refer to in connection with the accommodation therewith of the improved educational appliance is the motor 1, here shown as a spring motor, operating a gear wheel 2 and driving through the intermediary of a pinion 3 the usual main shaft 4 which supports the turntable of the phonograph.

For the purpose of the present invention, a plate 5 of appropriate size and area is secured by a cap screw 6 to the supporting post 7 of the motor mechanism of the phonograph, and on the under side of this plate is arranged at spaced intervals and in alignment bearings 8 in which is rotatably mounted a supporting rod 9, collars 10 cooperating with one of the bearings to prevent relative endwise movement of the rod.

A pin 11 has a driving fit in an opening 12 cored in the lower end of one of the motor shafts, preferably the main shaft 4, and on this pin is arranged a beveled gear 13, which gear is formed with a collar 14 to receive the pin, a set screw 15 fixing the beveled gear with respect to the pin. The beveled gear 13 preferably operates in an opening 16 formed in the plate 5, and secured upon the shaft 9, as by a transverse pin 17, is a cooperating beveled gear 18 which, through cooperation with the gear 13 and the driving of the latter and the turning of the shaft 4, rotative movement is imparted to the supporting rod 9 of the educational appliance.

The shaft 9 extends to and aligns with an opening 19 in one wall 20 of the enclosing phonograph case, the supporting shaft terminating within and immediately adjacent such wall in the form of a sleeve 21, the outer end of which is cored at 22 for an appropriate portion of the length of the sleeve and terminates at the inner end of the cored portion in a threaded extension 23 of somewhat less diameter than that of the cored portion. A discharge section 24 formed at one end with a threaded extension 25 to cooperate with the threaded portion 23 of the supporting rod and beyond such threaded extension accurately fitting the cored out portion 22 of the supporting rod sleeve is of such length as to project beyond the wall 20 of the phonograph casing, extending through the opening 19, that portion of the discharge section of the supporting rod which extends beyond the wall 20 being formed with threads 26 which In the operation of the educational appliance, and assuming the discharge section 24 of the supporting rod in place, cards, indicated at 27, bearing the desired data on their faces are placed in successive order on the threaded portion 26 of the discharge section 24. These cards are formed near their upper ends or at any other appropriate point with an opening which, if desired, may be metal bound and which cooperates with the threads 26 of the discharge section of the supporting rod. When in position, as indicated in Figure 1, the outermost card will have its data displayed to the eye of the pupil or observer and as the supporting rod, and thereby the discharge section, is turned incidentally to the movement of the power mechanism of the phonograph, the initial card will, by reason of its movement longitudinally of the discharge section incident to the threaded connection, be eventually discharged from the end of that section and the data on the next card will be displayed.

As the cards all advance simultaneously, it will be apparent that the time of discharge of the first card may be determined by the distance such first card is initially disposed from the end of the discharge section of the supporting rod. If this initial card is placed on the discharge section of the supporting rod at the first complete thread, it is apparent that one complete turn of the supporting rod will discharge the initial card. If the succeeding cards are arranged in close contact with the initial card and with each other, each turn of the discharge section of the supporting rod will discharge or drop a card. Of course, the cards may be arranged various distances to enable any particular card or cards to remain in view for a greater length of time, though it is contemplated that the time period in which a particular card may remain in view is to be more readily and easily controlled by regulating the speed of the motor through which the supporting rod is turned. Through this regulation, the actual time period in which a particular card remains in display position may be regulated as desired, that is, within the limits of the control, and the various spacings of the respective cards longitudinally of the discharge section may furnish a further factor for controlling this time period independently of or in conjunction with the speed control of the motor mechanism of the phonograph.

As an essential and desirable part of the educational appliance, there is provided a cabinet 28 having at least two drawers underlying the discharge section of the supporting rod. Either of these drawers may serve as a storage receptacle for cards not in use, while the other of such drawers is designed to be extended or open during the use of the educational appliance to serve as a receptacle from the discharge section of the supporting rod.

It will, of course, be understood that when the educational appliance is not in use, the discharge section may be readily disconnected from the supporting rod proper, whereupon there exists no projection of the educational appliance beyond the casing of the phonograph proper.

The educational appliance is particularly useful in teaching, as it enables the teacher to present facts or problems to the eye of the pupil for a definite and predetermined period in order to train the mind of the pupil in grasping the facts or problems within the reasonable time allowed and thus train the eye and mind in an obvious and highly desirable manner.

I claim:—

A card feeding and discharging device for use in connection with phonographs of the type including a casing and a power means, said device comprising a shaft to be removably connected to the power means and extending when so connected beyond the casing, said shaft being exteriorly threaded and serving to loosely support a series of cards and to advance said cards progressively toward the free end of the shaft by means of the threads on the shaft.

In witness whereof, I hereunto subscribe my name to this specification.

MICHAEL M. GUHIN.